(12) United States Patent
Kauper et al.

(10) Patent No.: US 11,819,931 B2
(45) Date of Patent: Nov. 21, 2023

(54) DRILL

(71) Applicant: Kennametal Inc., Latrobe, PA (US)

(72) Inventors: Herbert Rudolf Kauper, Rosstal (DE); Jürgen Schwägerl, Vohenstrauss (DE); Christian Strauchmann, Eggolsheim (DE)

(73) Assignee: KENNAMETAL INC., Latrobe, PA (US)

( * ) Notice: Subject to any disclaimer, the term of this patent is extended or adjusted under 35 U.S.C. 154(b) by 174 days.

(21) Appl. No.: 17/212,253

(22) Filed: Mar. 25, 2021

(65) Prior Publication Data

US 2021/0299763 A1 Sep. 30, 2021

(30) Foreign Application Priority Data

Mar. 27, 2020 (DE) .......................... 102020204035.4

(51) Int. Cl.
B23B 51/02 (2006.01)
(52) U.S. Cl.
CPC .......... *B23B 51/02* (2013.01); *B23B 2251/18* (2013.01); *B23B 2251/241* (2013.01)
(58) Field of Classification Search
CPC .......... B23B 2251/14; B23B 2251/282; B23B 2251/285; B23B 2251/287; B23B 2251/28; B23B 2251/204; B23B 51/02
See application file for complete search history.

(56) References Cited

U.S. PATENT DOCUMENTS

| | | | |
|---|---|---|---|
| 1,000,067 A * | 8/1911 | Bennett | ................. B23B 51/108 |
| | | | 408/224 |
| 4,645,389 A | 2/1987 | Maier | |
| 5,273,380 A | 12/1993 | Musacchia | |
| 6,267,542 B1 | 7/2001 | Salmon | |
| 2007/0251733 A1* | 11/2007 | Hoeggerl | ................ B23B 51/00 |
| | | | 175/435 |
| 2008/0193234 A1 | 8/2008 | Davancens et al. | |
| 2011/0081215 A1 | 4/2011 | Nakamura et al. | |
| 2020/0391305 A1* | 12/2020 | Tsukihara | ............. C23C 28/044 |

FOREIGN PATENT DOCUMENTS

| | | |
|---|---|---|
| CN | 202162423 U | 3/2012 |
| DE | 10346217 A1 | 4/2005 |
| JP | 2016112662 | 6/2016 |
| KR | 101000863 | 12/2010 |
| WO | WO-2012154644 A1 * | 11/2012 ............. B23B 51/02 |

OTHER PUBLICATIONS

English translation of WO 2012154644 (Year: 2012).*
Sep. 30, 2020 Office Action (non-US) DE App. No. 102020204035.4.
Mar. 9, 2023 Foreign Office Action Chinese Application No. CN202110289390.9, 2 Pages.

* cited by examiner

*Primary Examiner* — Alan Snyder
(74) *Attorney, Agent, or Firm* — Christopher J. Owens

(57) ABSTRACT

The invention relates to a drill comprising a drill tip, wherein the drill tip comprises at least one main cutting edge having a cutting corner, from which the main cutting edge extends to a center, wherein the drill tip comprises at least one additional cutting edge having an additional cutting corner, from which the additional cutting edge extends in the direction of the center, wherein the additional cutting edge is formed only on an outer portion of the drill tip and is thus shorter than the main cutting edge, wherein the additional cutting corner projects beyond the cutting corner.

11 Claims, 2 Drawing Sheets

DRILL

RELATED APPLICATION DATA

The present application claims priority pursuant to 35 U.S.C. § 119(a) to German Patent Application Number 102020204035.4 filed Mar. 27, 2020 which is incorporated herein by reference in its entirety.

FIELD

The present invention relates to rotatory cutting tools and, in particular, to drills.

BACKGROUND

A drill is used for machining a workpiece by means of drilling. For this purpose, a drill comprises a drill tip having two main cutting edges, for example, which lift chips away from the workpiece as the drill rotates about a longitudinal axis. The front of the drill is thereby subjected to a sometimes heavy load, which leads to wear. Said wear is usually greatest in radial direction outward, so that damage often occurs here first. The so-called cutting corner, which forms an outer end of a respective main cutting edge, is particularly affected. The service life of the drill is then limited primarily by the wear of the cutting corner.

KR 101 000 863 B1 describes a drill which, in addition to two main cutting edges, comprises two more auxiliary cutting edges which are formed between the main cutting edges. The auxiliary cutting edges have a length that corresponds to 0.4 times the radius of the drill. A portion of the torque is distributed from the main cutting edges to the auxiliary cutting edges and an increased feed rate is possible.

SUMMARY

With this in mind, the object of the invention is to provide an improved drill which has the longest possible service life.

The object is achieved according to the invention by a drill having the features according to Claim 1. Advantageous configurations, further developments, and variants are the subject matter of the subclaims.

The drill is used for machining a workpiece by means of drilling. In general, the drill is a rotary tool, which extends along a longitudinal axis about which the drill rotates in a direction of rotation when it is operating.

The drill comprises a drill tip, which is formed on the front side of the drill and thus faces a workpiece during operation. The drill tip is either formed in one piece, i.e. monolithic, with a base body of the drill or as a cutting insert for a base body of the drill.

The drill tip comprises at least one main cutting edge having a cutting corner, from which the main cutting edge extends to a center of the drill. The main cutting edge provides a first cutting action of the drill. The center is in particular a circular inner region of the drill and has a radius that preferably corresponds to 0.1 to 0.3 times the total diameter of the drill. In the center, the drill tip preferably comprises a chisel edge. For this purpose, a point thinning is expediently formed in the center, so that the main cutting edge transitions into the chisel edge at the transition to the center. On the outer edge, on the other hand, i.e. on the cutting corner, the main cutting edge is adjoined in particular by a secondary cutting edge which generally extends in axial direction, for example helically around the longitudinal axis.

The drill tip further comprises at least one additional cutting edge having an additional cutting corner, from which the additional cutting edge extends in the direction of the center. The additional cutting edge is formed only on an outer portion of the drill tip and is thus shorter than the main cutting edge. The additional cutting edge provides an additional, second cutting action. The configuration of the additional cutting edge is fundamentally the same as that of the main cutting edge, such that the additional cutting edge also extends generally from a cutting corner, in this case more specifically the additional cutting corner, toward the center on an outer edge of the drill tip. In contrast to the main cutting edge, however, the additional cutting edge does not extend all the way to the center, but ends earlier, so that the additional cutting edge as a whole is shorter. This creates an outer portion of the drill tip, which surrounds the center and extends inward over a defined radius from the outer edge of the drill tip, i.e. from an outer surface of the drill. The outer portion is either directly adjacent to the center or a further and likewise annular center section is disposed between the center and the outer portion. The center, center section and outer portion are in particular disposed concentrically. The radius of the outer portion, i.e. its thickness, and thus the length of the additional cutting edge are preferably 0.1 to 0.5 times, particularly preferably 0.2 to 0.4 times, a total radius of the drill, and thus approximately one third of the total radius. The total radius corresponds to half the total diameter.

Like the main cutting edge and its cutting corner, the additional cutting edge, specifically its additional cutting corner, is also suitably adjoined by a secondary cutting edge. This too extends generally in axial direction, for example helically around the longitudinal axis.

In the present case, the additional cutting corner projects beyond the cutting corner. This means in particular that, when looking at the main cutting edge against to the direction of rotation, the additional cutting corner is not completely covered by the cutting corner and disappears behind it, but rather that the additional cutting corner projects and thus forms an overhang relative to the cutting corner which follows the cutting corner. Roughly speaking, the additional cutting corner is configured to be larger than or project beyond the cutting corner. In particular, therefore, the additional cutting edge also projects partially or completely beyond the main cutting edge.

One essential aspect of the invention is in particular relieving the load of the main cutting edge and specifically its cutting corner by means of the additional additional cutting edge and specifically by means of its additional cutting corner. Due to the additional cutting action on the outer portion, the load on the main cutting edge is correspondingly relieved in radial direction on the outside. Any type of load is distributed between the main cutting edge and the trailing additional cutting edge. Since the load increases with increasing radius and is the greatest at the outer edge, the additional cutting edge in the present case is configured to be shorter than the main cutting edge in order to relieve the load on the outside specifically, and to achieve the highest possible stability of the drill tip toward the inside. The wear on the main cutting edge is then also much more homogeneous, as a result of which the service life is improved.

In principle, it is already sufficient to align the additional cutting corner with the cutting corner, i.e. make them both the same size. In this way, too, part of the load on the cutting corner is absorbed by the additional cutting corner. This goes even further, however, and the additional cutting corner is specifically configured to project; i.e. the additional cutting corner has an overhang relative to the cutting corner. A significantly more precise and particularly targeted distribution of the load between the cutting corner and the additional cutting corner is thus possible. The distribution can now be optimally customized to a wide variety of applications.

In one advantageous configuration, the additional cutting corner projects beyond the cutting corner in an axial direction, i.e. along the longitudinal axis of the drill. Accordingly, the drill is longer at the additional cutting corner than at the cutting corner. This results in a length difference, which is preferably from 0.05 mm to 2 mm. Therefore, the additional cutting corner accordingly projects beyond the cutting corner in axial direction by this length difference, which is also referred to as an axial overhang. The axial overhang is constant along the additional cutting corner in one configuration and varies in another configuration.

The axial overhang in particular leads to the additional cutting corner projecting in axial direction relative to the cutting corner. In general, however, the additional cutting corner does not also project in axial direction beyond the chisel edge of the drill, but is preferably set back with respect to said chisel edge; i.e. offset backward in axial direction by a defined distance. Viewed strictly in axial direction from the front to the rear, the additional cutting corner is then positioned between the chisel edge and the cutting corner. In axial direction, therefore, the chisel edge in particular forms a frontmost point of the drill.

In another advantageous configuration, the additional cutting corner projects beyond the cutting corner in a radial direction, i.e. perpendicular to the longitudinal axis. Analogous to the length difference in axial direction, the drill then has a larger radius at the additional cutting corner than at the cutting corner. This results in a radius difference, which is preferably from 0.05 mm to 2 mm. Therefore, the additional cutting corner accordingly projects beyond the cutting corner in radial direction by this radius difference, which is also referred to as a radial overhang. The radial overhang is constant along the additional cutting corner in one configuration and varies in another configuration.

The radial and the axial overhang can advantageously also be combined with one another, so that the additional cutting corner then projects beyond the cutting corner in both radial direction and axial direction.

The cutting corner is generally a component of the main cutting edge and forms the end of said main cutting edge in radial direction and to the outside. Similarly, the additional cutting corner is also generally a component of the additional cutting edge and forms the end of said additional cutting edge in radial direction and to the outside. In principle, there are a variety of suitable configurations for the cutting corner and the additional cutting corner, which are in particular selected depending on the specific application.

In one suitable configuration, the additional cutting corner is rounded. As a result, the additional cutting corner per se is not point-shaped, but rather itself forms a corner cutting edge, which accordingly is or corresponds to an outer partial cutting edge of the additional cutting edge. In other words, either the additional cutting edge is identical to the corner cutting edge, so that the additional cutting edge is limited to the rounded additional cutting corner, or the corner cutting edge is adjoined to the inside by an inner partial cutting edge, which then as a whole together with the corner cutting edge forms the additional cutting edge. The specific design depends on how far the additional cutting edge is to extend toward the center and how long the corner cutting edge is; i.e. how strongly the additional cutting corner is rounded. The additional cutting corner is preferably rounded because it has a corner radius of 0.4 mm to 5 mm. The corner radius is in particular measured in an imaginary plane, which extends parallel or at only a small angle of up to 20° to the longitudinal axis. The transition between the inner and the outer partial cutting edge is expediently continuous, i.e. rounded and specifically not pointed or discontinuous. The transition from the corner cutting edge to the secondary cutting edge is either likewise continuous or, alternatively, a corner is formed here.

Alternatively, in one suitable configuration, the additional cutting corner is pointed. Here, the additional cutting edge extends predominantly radially outward and meets the secondary cutting edge at a defined angle of, for example, more than 90° to 120°. In the pointed configuration, a corner or point is then formed at the end of the additional cutting edge with the additional cutting corner.

The rounded additional cutting corner is in particular advantageous for machining abrasive materials such as cast iron. Due to the rounded design, the load on the outer edge is distributed over a longitudinally extended area, namely the outer partial cutting edge. In contrast, with the pointed configuration, the load on the outer edge is directed selectively onto the pointed additional cutting corner. Then again, the pointed configuration is particularly suitable for machining soft and less abrasive materials such as aluminum.

Like the additional cutting corner, the cutting corner of the main cutting edge is preferably rounded or pointed depending on the application. Expediently, the cutting corner and the additional cutting corner are both rounded or both pointed. A mixed configuration, in which the cutting corner is rounded and the additional cutting corner is pointed or vice versa is also possible, however, at least as long as the additional cutting corner still projects beyond the cutting corner.

Particularly preferred is a design, in which the cutting corner and the additional cutting corner are configured to have the same shape. This means that the cutting corner and the additional cutting corner each have a contour, which then have the same profile, but are dimensioned differently, so that the additional cutting corner is an enlarged version of the cutting corner and consequently projects accordingly. Therefore, the additional cutting corner results from a corresponding scaling of the cutting corner without distortion. The overhang of the additional cutting corner is thus particularly uniform.

The cutting corner and the additional cutting corner preferably enclose an angle that is less than 90°. An angle in the range of 20° to 80° is particularly preferred. The angle is in particular measured in the direction of rotation; i.e. in a plane perpendicular to the longitudinal axis. This is based on the observation that the distribution of the load between the cutting corner and the additional cutting corner can be adjusted not only via the overhang of the additional cutting corner, but also via the angle. The reason for this is that the angle determines how much of the machining of the workpiece is done by the additional cutting corner relative to the cutting corner during one full rotation of the drill. The smaller the angle, the smaller the load on the additional cutting corner and the greater the load on the cutting corner.

In conjunction with the overhang, this then results in a two-dimensional parameter space, in which the distribution of the load is adjusted as a function of the two parameters angle and overhang. The load can thus be kept constant if the angle is increased with a smaller overhang or vice versa. The distribution can accordingly be changed for a given overhang or angle by adjusting the angle or the overhang; i.e. the corresponding other parameter. Manufacturing-related limitations with regard to the overhang or the angle, for example, are thus advantageously overcome by the other parameter.

In one advantageous configuration, the drill comprises a plurality of main cutting edges, each of which has a cutting corner that is respectively followed by an additional cutting corner which encloses an angle with the cutting corner, so that a plurality of angles are formed. Said angles preferably have different sizes. In other words, in the case of a drill having a plurality of main cutting edges and a respectively associated additional cutting corner, a corresponding number of angles are formed as well. These angles are expediently selected to have different sizes in order to reduce vibrations and in particular reduce a so-called chattering of the workpiece or the drill during machining. Selecting different angles breaks up the otherwise existing symmetry of the drill, so that the vibration characteristics of the system consisting of the drill and the workpiece change advantageously during machining.

The main cutting edge is in particular preceded by a flute, via which chips that are lifted off by the main cutting edge are carried away in axial direction from the drill tip toward the rear. The flute extends in particular over the full length of the main cutting edge and then also ends at the center. The center thus also forms a core of the drill, to which the flute extends, but which the flute does not enter, so that the flute then has a depth that corresponds to the difference between the total radius of the drill and a core radius of the core.

The drill preferably comprises a flute, which precedes the additional cutting corner, for receiving chips on the additional cutting corner. In addition to the flute to the main cutting edge, the drill therefore comprises a further flute to the additional cutting edge. The chips that are produced by the additional cutting corner and in general by the additional cutting edge are carried away via this additional flute. These chips usually have a different shape than the chips on the main cutting edge. Since the additional cutting edge is shorter, shorter chips are typically also produced here. The flute to the additional cutting edge is also suitably shallower than the flute to the main cutting edge and therefore projects less far into the base body of the drill. This in particular leaves space for an optional coolant channel, which, viewed in the direction of rotation, is expediently disposed between the main cutting edge and the flute to the additional cutting edge. Both flutes are preferably helical.

In one advantageous configuration, the main cutting edge is adjoined by a free surface which slopes downward in the direction of the additional cutting corner and transitions into a secondary free surface which slopes upward in the direction of the additional cutting corner. The free surface behind the main cutting edge in particular forms a clearance angle. Due to the free surface and the secondary free surface, the drill tip comprises a recess, which is disposed between the main cutting edge and the center on the one hand and the additional cutting edge and the additional cutting corner on the other hand, and which prevents the drill tip from rubbing on the workpiece during operation.

The additional cutting edge preferably ends toward the center at a secondary free surface, which is in particular the secondary free surface already described above. The secondary free surface is thus disposed between the center and the additional cutting edge. The length of the additional cutting edge is then limited by the secondary free surface.

The free surface to the main cutting edge is bounded in the front by this same main cutting edge. In the rear, the free surface in the center is in particular bounded by the point thinning, through which the chisel edge is formed. In the rear toward the outer edge, the free surface is bounded in particular by the flute to the additional cutting edge. The secondary free surface is then disposed between the point thinning and the flute. This then also bounds the free surface in the rear. While the drill tip continues to slope downward from the free surface into the flute to the additional cutting edge and into the point thinning, the secondary free surface conversely causes an upward slope, so that the additional cutting corner projects accordingly. In the rear, the secondary free surface preferably transitions into the point thinning and in the front into the flute to the additional cutting edge. The secondary free surface is in particular configured to be fundamentally similar to the point thinning, namely such that the additional cutting edge is formed on the end side by the secondary free surface.

The drill can in principle comprise a plurality of main cutting edges, of which one, multiple, or all follow one or more additional cutting edges. Particularly preferred is a configuration in which the drill comprises exactly two main cutting edges, each having a cutting corner, which is followed by exactly one additional cutting corner, more precisely one additional cutting edge having an additional cutting edge. A drill having two main cutting edges is also referred to as a two-edge drill and has particularly good stability and especially centering during operation. This stability is hardly or not at all impaired by the additional but shorter additional cutting edges.

Instead, the additional cutting edges result in a more homogeneous load and wear of the main cutting edges and specifically their cutting corners.

BRIEF DESCRIPTION OF THE DRAWINGS

Design examples of the invention are explained in more detail in the following with the aid of a drawing. The figures show schematically.

DETAILED DESCRIPTION

Figure 1:
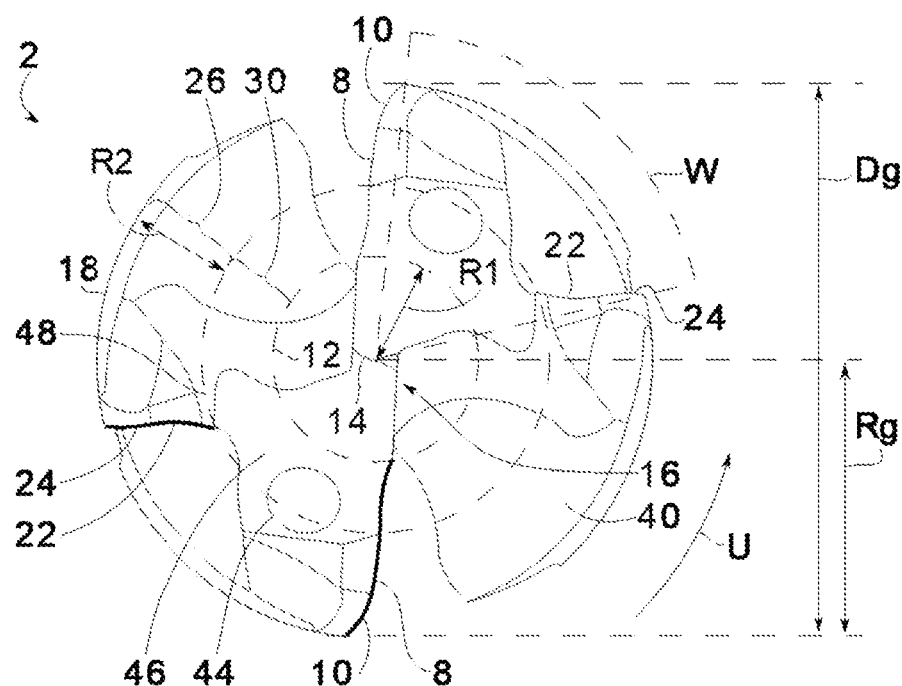
FIG. 1 a front view of a drill,
FIG. 2 a detail of the drill of FIG. 1 in a perspective view,
FIG. 3 a detail of the drill of FIG. 1 in a side view,
FIG. 4 a detail of the drill of FIG. 1 in a different side view.
Figure 2:
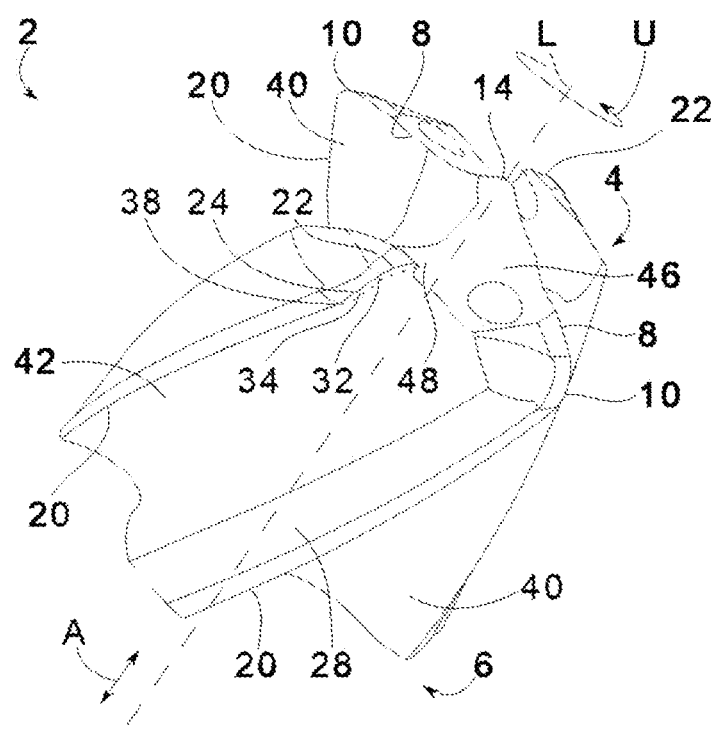
Figure 3:
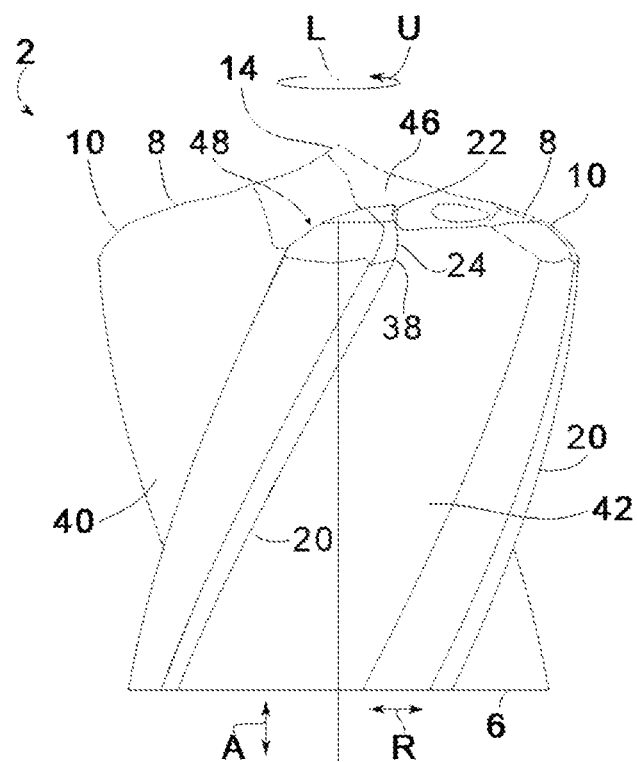
Figure 4:
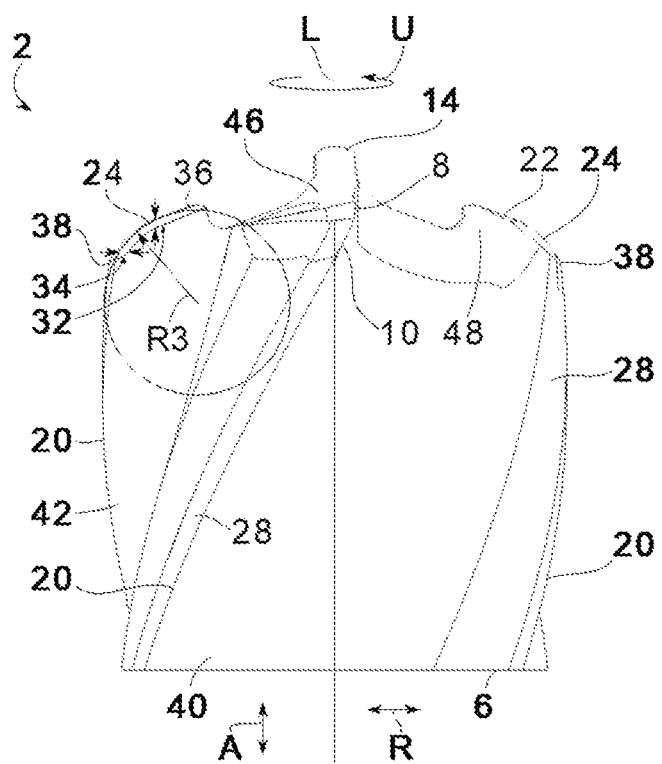

FIG. 1-4 show a design example of a drill 2, which is used for machining a not depicted workpiece by means of drilling. In general, the drill 2 is a rotary tool, which extends along a longitudinal axis L about which the drill 2 rotates in a direction of rotation U when it is operating. FIG. 1 shows a front view of the drill 2, FIG. 2 shows a perspective view, and FIGS. 3 and 4 show respective side views, whereby the view of FIG. 3 is rotated 90° in the direction of rotation U from the view in FIG. 4. The drill 2 comprises a drill tip 4, which is formed on the front side of the drill 2 and thus faces a workpiece during operation. In the shown design example, the drill tip 4 is formed in one piece, i.e. monolithically, with a base body 6 of the drill 2. In a not depicted alternative, the drill tip 4 is configured as a cutting insert for a base body 6 of the drill 2.

The drill tip 4 comprises at least one main cutting edge 8 having a cutting corner 10, from which the main cutting edge 8 extends to a center 12 of the drill 2. One of the two main cutting edges 8 in FIG. 1 is emphasized with a thicker line. The main cutting edge 8 provides a first cutting action of the drill. The center has a radius R1, which here corresponds to 0.1 to 0.3 times a total diameter Dg of the drill 2.

The total diameter Dg corresponds to double the total radius Rg. In the center 12, the drill tip 4 here also comprises a chisel edge 14. For this purpose, a point thinning 16 is formed, so that the main cutting edge 8 transitions into the chisel edge 14 at the transition to the center 12. On the outer edge 18, on the other hand, i.e. on the cutting corner 10, the main cutting edge 8 is adjoined by a secondary cutting edge 20 which generally extends in axial direction A, for example helically around the longitudinal axis L.

The drill tip 4 further comprises at least one additional cutting edge 22 having an additional cutting corner 24, from which the additional cutting edge 22 extends in the direction of the center 12. One of the two additional cutting edges 22 in FIG. 1 is likewise emphasized with a thicker line. The additional cutting edge 22 is formed only on an outer portion 26 of the drill tip 4 and is thus shorter than the main cutting edge 8. The additional cutting edge 22 provides an additional, second cutting action. The configuration of the additional cutting edge 22 is fundamentally the same as that of the main cutting edge 8, such that the additional cutting edge 22 also extends generally from a cutting corner, in this case more specifically the additional cutting corner 24, toward the center 12 on an outer edge 18 of the drill tip 4. In contrast to the main cutting edge 8, however, the additional cutting edge 22 does not extend all the way to the center 12, but ends earlier, so that the additional cutting edge 22 as a whole is shorter. This creates an outer portion 26 of the drill tip 4, which surrounds the center 12 and extends inward over a defined radius R2 from the outer edge 18, i.e. from an outer surface 28 of the drill 2. The outer portion 26 is either directly adjacent to the center 12 or, as can be seen in FIG. 1, a further and likewise annular center section 30 is disposed between the center 12 and the outer portion 26. The center 12, center section 30 and outer portion 26 here are disposed concentrically. The radius R2 of the outer portion 26, i.e. the thickness of said outer portion, and thus the length of the additional cutting edge 22, here is 0.1 to 0.5 times the total radius Rg.

Like the main cutting edge 8 and its cutting corner 10, the additional cutting edge 22, specifically its additional cutting corner 24, is also adjoined by a secondary cutting edge 20. This too extends generally in axial direction A, here helically around the longitudinal axis. The secondary cutting edges 20 can be seen in particular in FIG. 2.

In the present case, the additional cutting corner 24 projects beyond the cutting corner 10. This means that, when looking at the main cutting edge 8 against the direction of rotation U, the additional cutting corner 24 is not completely covered by the cutting corner 10 and disappears behind it, but rather that the additional cutting corner 24 projects and thus forms an overhang 32, 34 relative to the cutting corner 10 which follows the cutting corner 10. The additional cutting edge 22 here also projects partially or completely beyond the main cutting edge 10.

In the shown configuration, the additional cutting corner 24 projects beyond the cutting corner 10 in an axial direction A, i.e. along the longitudinal axis L. Accordingly, the drill 2 is longer at the additional cutting corner 24 than at the cutting corner 10. This results in a length difference, which is from 0.05 mm to 2 mm here and is also referred to as the axial overhang 32. The additional cutting corner 24 furthermore also projects beyond the cutting corner 10 in a radial direction R, i.e. perpendicular to the longitudinal axis L. Analogous to the length difference in axial direction A, the drill 2 then has a larger radius Rg at the additional cutting corner 24 than at the cutting corner 10. This results in a radius difference, which is from 0.05 mm to 2 mm here and is also referred to as the radial overhang 34. In FIGS. 2 and 4, the two overhangs 32, 34 are indicated by a dashed line below the additional cutting edge 22 and the radius and the length difference are additionally indicated by two respective arrows.

The radial overhang 34 and the axial overhang 32 can also be realized independently of one another, so that the additional cutting corner 24 then projects beyond the cutting corner 10 either in radial direction R or in axial direction A.

The cutting corner 10 is generally a component of the main cutting edge 8 and forms the end of said main cutting edge in radial direction R and to the outside. Similarly, the additional cutting corner 24 is also generally a component of the additional cutting edge 22 and forms the end of said additional cutting edge in radial direction R and to the outside. In principle, there are a variety of suitable configurations for the cutting corner 10 and the additional cutting corner 24.

For example, in the design example shown, the additional cutting corner 24 is rounded and itself forms a corner cutting edge. The rounded additional cutting corner 24 here is largely identical to the additional cutting edge 22. As shown in FIG. 4, the additional cutting corner 24 is an outer partial cutting edge of the additional cutting edge 22. This is adjoined to the inside by an inner partial cutting edge 36, which together with the corner cutting edge then forms the additional cutting edge 22. As in the shown design example, for example, the inner partial cutting edge 36 is a straight continuation of a rounded outer partial cutting edge. On the other hand, in a not depicted variant, the rounded additional cutting corner 24 corresponds exactly to the additional cutting edge 22, is thus identical to additional cutting edge and does not comprise an inner partial cutting edge 36.

In the shown design example, the additional cutting corner 24 is rounded because it has a corner radius R3 of 0.4 mm to 5 mm. The additional cutting edge 24 extends overall continuously. The transition from the additional cutting corner 24 to the secondary cutting edge 20, on the other hand, is configured here as a corner 38.

In a not depicted alternative, the additional cutting corner 24 is not rounded, but is instead pointed. In this case, the additional cutting edge 24 then extends predominantly radially outward and meets the secondary cutting edge 20 at a defined angle. In the pointed configuration, a corner 38 is formed at the end of the additional cutting edge 22 with the additional cutting corner 24.

In the shown design examples, both the cutting corner 10 and the additional cutting corner 24 are rounded. However, a mixed configuration, in which the cutting corner 10 is rounded and the additional cutting corner 24 is pointed or vice versa, is in principle possible as well. In the shown design example, the cutting corner 10 and the additional cutting corner 24 are configured to have the same shape; i.e. they each have a contour, which then have the same profile, but are dimensioned differently. The additional cutting corner 24 is therefore an enlarged version of the cutting corner 10 and consequently projects accordingly.

In the shown design example, the cutting corner 10 and the additional cutting corner 24 enclose an angle W that is less than 90°. The angle W is explicitly shown in FIG. 1. The angle W determines how much of the machining of the workpiece is done by the additional cutting corner 24 relative to the cutting corner 10 during one full rotation of the drill 2. The smaller the angle W, the smaller the load on the additional cutting corner 24 and the greater the load on the cutting corner 10. In conjunction with the overhang 32, 34, this then results in a two-dimensional parameter space, in which the distribution of the load is adjusted as a function of the two parameters angle W and overhang 32, 34.

In the shown design example, the drill 2 comprises two angles W, which are also the same size. In contrast, in a configuration that is not explicitly shown but is equally suitable, the angles W are different sizes.

In the shown design examples, the main cutting edge 8 is preceded by a flute 40, via which chips that are lifted off by the main cutting edge 8 are carried away in axial direction A from the drill tip 4 toward the rear. The flute 40 here extends over the full length of the main cutting edge 8 and also ends at the center 12. The drill 2 further comprises an additional flute 42, which precedes the additional cutting corner 24, for receiving chips at the additional cutting corner 24 that are produced by said additional cutting corner 24 and in general by the additional cutting edge 22. The flute 42 to the additional cutting edge 22 is also shallower than the flute 40 to the main cutting edge 8 and therefore projects less far into the base body 6. This leaves space for an optional coolant channel 44, which, viewed in the direction of rotation U in the shown design example, is disposed between the main cutting edge 8 and the flute 42 to the additional cutting edge 22. Both flutes 40, 42 are helical here.

As can be seen in the figures, the main cutting edge 8 is adjoined by a free surface 46 which slopes downward in the direction of the additional cutting corner 24 and transitions into a secondary free surface 48 which slopes upward in the direction of the additional cutting corner 24. Due to the free surface 46 and the secondary free surface 48, the drill tip 4 comprises a recess, which is disposed between the main cutting edge 8 and the center 12 on the one hand and the additional cutting edge 22 and the additional cutting corner 24 on the other hand, and which prevents the drill tip 4 from rubbing on the workpiece during operation. The additional cutting edge 22 here ends toward the center 12 at the secondary free surface 48, which is thus disposed between the center 12 and the additional cutting edge 22. The additional cutting edge 22 is formed on the end side by the secondary free surface 48.

The free surface 46 is bounded in the front by the main cutting edge 8. In the rear, the free surface 46 in the center 12 is bounded by the point thinning 16. In the rear toward the outer edge 18, the free surface 46 is bounded by the flute 42 to the additional cutting edge 22. The secondary free surface 48 is then disposed between the point thinning 16 and the flute 42. This then also bounds the free surface 46 in the rear. While the drill tip 4 continues to slope downward from the free surface 46 into the flute 42 to the additional cutting edge 22 and into the point thinning 16, the secondary free surface 48 conversely causes an upward slope, so that the additional cutting corner 24 projects accordingly. In the rear, the secondary free surface 48 here also transitions into the point thinning 16 and in the front into the flute 42 to the additional cutting edge 22.

The drill 2 can in principle comprise a plurality of main cutting edges 8, of which one, multiple, or all follow one or more additional cutting edges 22. In the shown design example, the drill 2 comprises exactly two main cutting edges 8, each having a cutting corner 10, which is followed by exactly one additional cutting corner 24, more precisely one additional cutting edge 22 having an additional cutting corner 24.

The invention claimed is:

1. A drill comprising a drill tip,
   wherein the drill tip comprises at least one main cutting edge having a cutting corner, from which the main cutting edge extends to a center,
   wherein the drill tip comprises at least one additional cutting edge having an additional cutting corner, from which the additional cutting edge extends in the direction of the center,
   wherein the additional cutting edge is formed only on an outer portion of the drill tip and is thus shorter than the main cutting edge,
   wherein the additional cutting corner projects beyond the cutting corner, and
   wherein the main cutting edge is directly adjoined by a free surface which slopes downward in the direction of the additional cutting corner and transitions into a secondary free surface which slopes upward in the direction of the additional cutting corner.

2. The drill according to claim 1, wherein the additional cutting corner projects beyond the cutting corner in an axial direction (A).

3. The drill according to claim 1, wherein the additional cutting corner projects beyond the cutting corner in a radial direction (R).

4. The drill according to claim 1, wherein the additional cutting corner is rounded.

5. The drill according to claim 1, wherein the additional cutting corner is pointed.

6. The drill according to claim 1, wherein the cutting corner and the additional cutting corner are configured to have the same shape.

7. The drill according to claim 1, wherein the cutting corner and the additional cutting corner enclose an angle (W) that is less than 90°.

8. The drill according to claim 1, wherein said drill comprises a plurality of main cutting edges, each of which has a cutting corner that is respectively followed by an additional cutting corner which encloses an angle (W) with the cutting corner, so that a plurality of angles (W) are formed,
   wherein said angles (W) have different sizes.

9. The drill according to claim 1, wherein said drill comprises a flute, which precedes the additional cutting corner, for receiving chips on the additional cutting corner.

10. The drill according to claim 1, wherein the additional cutting edge ends toward the center at a secondary free surface.

11. The drill according to claim 1, wherein said drill comprises exactly two main cutting edges, each of which has a cutting corner that is respectively followed by exactly one additional cutting corner.

* * * * *